United States Patent

Hall et al.

[11] 4,159,400
[45] Jun. 26, 1979

[54] TOLL FRAUD DETECTOR

[75] Inventors: George A. Hall, Culver City; Alfred V. Milkowski, La Verne, both of Calif.

[73] Assignee: General Telephone Company of California, Santa Monica, Calif.

[21] Appl. No.: 932,741

[22] Filed: Aug. 10, 1978

[51] Int. Cl.² ............................................ H04M 1/66
[52] U.S. Cl. ................................ 179/7 R; 179/18 DA
[58] Field of Search .............. 179/7 R, 7.1 R, 7 MM, 179/8 R, 8 A, 18 DA, 2 A, 2 AM

[56] References Cited

U.S. PATENT DOCUMENTS

| | | | |
|---|---|---|---|
| 4,001,513 | 1/1977 | Naylor | 179/7 R |
| 4,002,848 | 1/1977 | Stein | 179/18 DA |
| 4,031,325 | 6/1977 | Dudonis et al. | 179/18 DA |
| 4,046,962 | 9/1977 | Rogers | 179/18 DA |

Primary Examiner—Kathleen H. Claffy
Assistant Examiner—Gerald L. Brigance
Attorney, Agent, or Firm—John F. Lawler

[57] ABSTRACT

A detector for a "Black Box" toll fraud is connected to circuits at the called party's central office and comprises a relay connected in series with the called subscriber's tip (T) lead, a fraudulent call register or indicator, and a normally open time delay switch with a timer actuated by a ringing signal on the ring (R) lead, which switch closes after a predetermined delay interval (ten seconds) to cause energizing of the register. The flow of direct current in the T lead incident to the called party going off-hook energizes the relay and deactivates the switch. The control (C) lead of the central office subscriber circuit is grounded by the off-hook state of the calling party's telephone and is connected to the register by closing of the delay switch, the indication of a fraudulent call being made by the register on removal of ground from the C lead, i.e., when the calling party goes on-hook. A terminal for connecting to the starting mechanism of a recorder is also provided in parallel with the time delay switch for turning the recorder on so that a permanent record of the fraudulent call may be made. In a modified form of the invention, means are provided to prevent indication of a fraudulent call by the register in the rare event a calling party does not go on-hook within the period of the delay interval following return of the called party's telephone to the on-hook position.

7 Claims, 5 Drawing Figures

GOOD CALL SEQUENCE

FRAUDULENT CALL SEQUENCE

TOLL FRAUD DETECTOR

BACKGROUND OF THE INVENTION

This invention relates to telephone security systems and more particularly to detectors for "Black Box" toll fraud. "Black Box" is a term applied to a contrivance attached to the telephone lines of a party who receives toll calls for the purpose of preventing telephone company equipment from initiating billing of the originating call. In general, the "Black Box" prevents the telephone circuit from returning answer (off-hook) supervision to the calling station by a resistance network applied to the phone at the called station. Conversation between the parties is generally conducted over the resistance of the device.

At present there are two known methods of observing a "Black Box" call. The first method is human observation of the supervisory conditions of the equipment and continuous monitoring of the suspected equipment for a fraudulent call. This method requires the full time availability of a person to serve as the monitor. It requires the person to observe all good calls as well as fraudulent calls in order to identify and determine that a "Black Box" is being used. The need for such thoroughness is dictated by legal requirements of the data as evidence in the prosecution of offenders.

The second method employed in the past is to bridge the line of the suspected subscriber with a device that attempts to sense a line change of the subscriber phone, and monitoring that line for voice signals and incorrect supervision. The difficulty with this technique is that existing equipment available to perform it is expensive and unreliable. The bridge-type equipment reacts to voice talk-off, i.e., false operation, causing the equipment to register a fraudulent call incorrectly.

There is need for an automatic unmanned reliable toll fraud detector—one which registers only fraudulent calls—in order to provide completely credible information useful as legally qualified evidence in the prosecution of perpetrators of such calls. This invention is directed toward the provision of such a detector.

OBJECTS AND SUMMARY OF THE INVENTION

A general object of the invention is the provision of a fully reliable detector for "Black Box" toll fraud.

Another subject is the provision of such a detector that is relatively inexpensive to manufacture.

Still another object is the provision of a "Black Box" toll fraud detector that may be readily installed on a suspected subscriber's lines quickly (10–15 minutes) and without disrupting normal operation of the telephone circuits.

These and other objects of the invention are achieved with a detector that utilizes telephone central office conditions to operate and reset detector components which react positively only to line conditions indicative of the use of a "Black Box". According to this invention, current sensitive means is placed in series with the T lead for controlling operation of a fraudulent call register through a time delay mechanism. If no direct current flows in the T lead within a predetermined time interval after cessation of ringing signals, the register is actuated to indicate that the call is fraudulent.

DESCRIPTION OF PREFERRED EMBODIMENT

Figure 1:
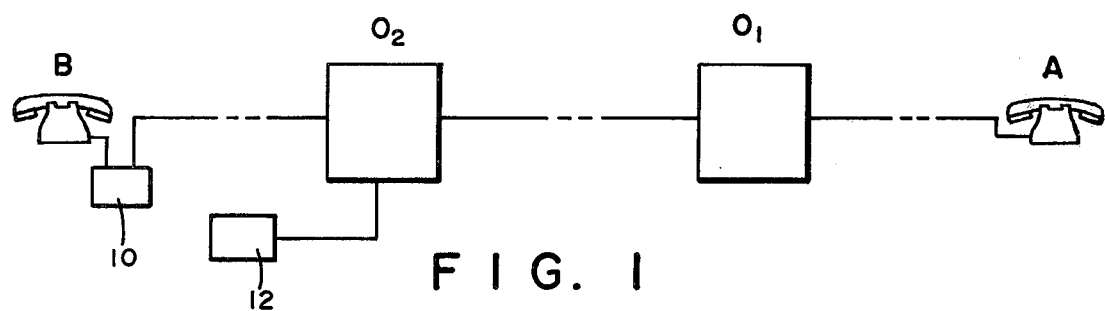
FIG. 1 is a simplified block diagram showing a telephone system illustrating the use of a "Black Box" and a toll fraud detector embodying this invention.

Referring now to the drawings, a telephone system is illustrated in FIG. 1 and comprises a calling subscriber A remotely located from a called subscriber B, both subscribers being represented by telephone instruments interconnected through central offices $O_1$ and $O_2$, respectively. In the normal operation of the system, central office $O_1$ of the calling party A contains the toll charge recording equipment which is activated by a supervisory signal generated by the change of control party B's telephone from the on-hook to the off-hook state, i.e., when the called party answers his phone. At the end of the call, both telephone instruments are returned to their on-hook states and the toll charge recorder is turned off. In order to avoid these charges and to perpetrate a fraud on the telephone company, the called party B may attach a "Black Box" 10 to his telephone instrument, the purpose of which is to simulate a continuing on-hook state of the telephone while, in fact, it is off-hook. This enables party B to complete a call with party A without actuating telephone company equipment to initiate billing of the originating call. In order to detect such fraudulent calls, in accordance with this invention, a toll fraud detector 12 is installed in central office $O_2$.

Figure 2:
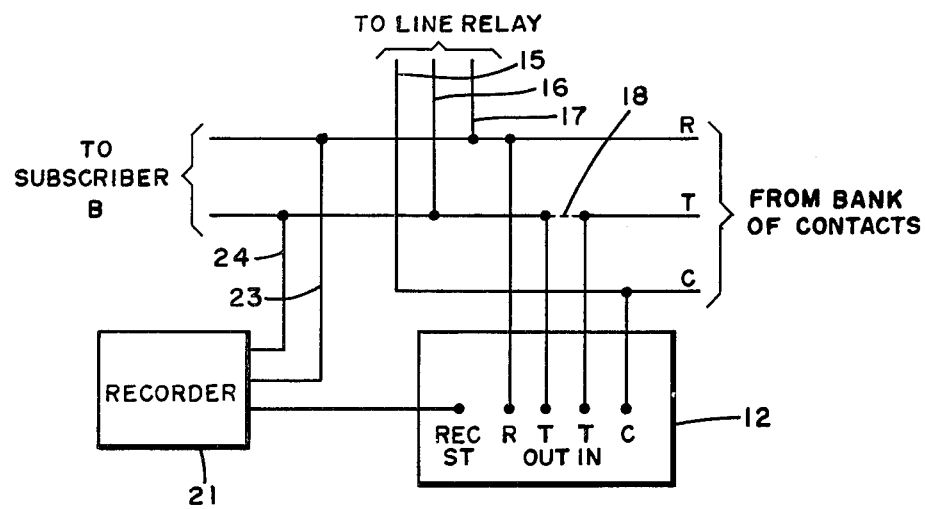
FIG. 2 is a simplified diagram of central office subscriber lines and the connection thereto of a detector embodying this invention.

The connection of toll fraud detector 12 to the telephone lines in office $O_2$ is shown in FIG. 2. Leads R (ring), T (tip), and C (control) connect to the subscriber B side of the bank of contacts, not shown, which selectively connect the incoming call from subscriber A to the lines of subscriber B. The R, T and C leads are respectively connected by lines 15, 16 and 17 to the line relay, not shown, for the subscriber B telephone which relay is operated to mark the lines of subscriber B busy to additional incoming calls. In the normal operation of the telephone circuits, when the connection is made at the bank of contacts between the calling party A and the lines of the called party B, a ringing generator, not shown, applies a signal to lead R which rings the bell on the telephone of subscriber B. A ground connection is automatically made to lead C and remains on that lead as long as the telephone of calling party A is in the off-hook state. When called party B answers, i.e., his telephone is changed to the off-hook state, the ringing signal generator is interrupted and a source of direct current is applied to the T lead for the purpose of providing talking current to the called party as well as answer supervision to the central office equipment. Prior to connection of fraud detector 12, the T lead from the bank of contacts is connected directly to the telephone of subscriber B without interruption as indicated by the broken line 18. The above description of the equipment at the central office $O_2$ is well known in the art and is sufficient to enable a full understanding of the invention.

Detector 12 has terminals designated C′, T-in, T-out, R′ and Rec. St. (Recorder Start). As shown, terminal C′ is directly connected in parallel with lead C. Similarly, terminal R′ is connected in parallel with lead R. Terminals T-in and T-out, however, are connected in series with the T lead, the jumper 18 being removed. The Rec. St. terminal is connected by a line 20 to a recorder 21 for the purpose of activating the latter. Recorder 21 has an audio connection to leads R and T of subscriber B through lines 23 and 24, respectively. The use of recorder 21 provides a record of additional information on any fraudulent call, its use being optional in the practice of the invention.

Figure 3:
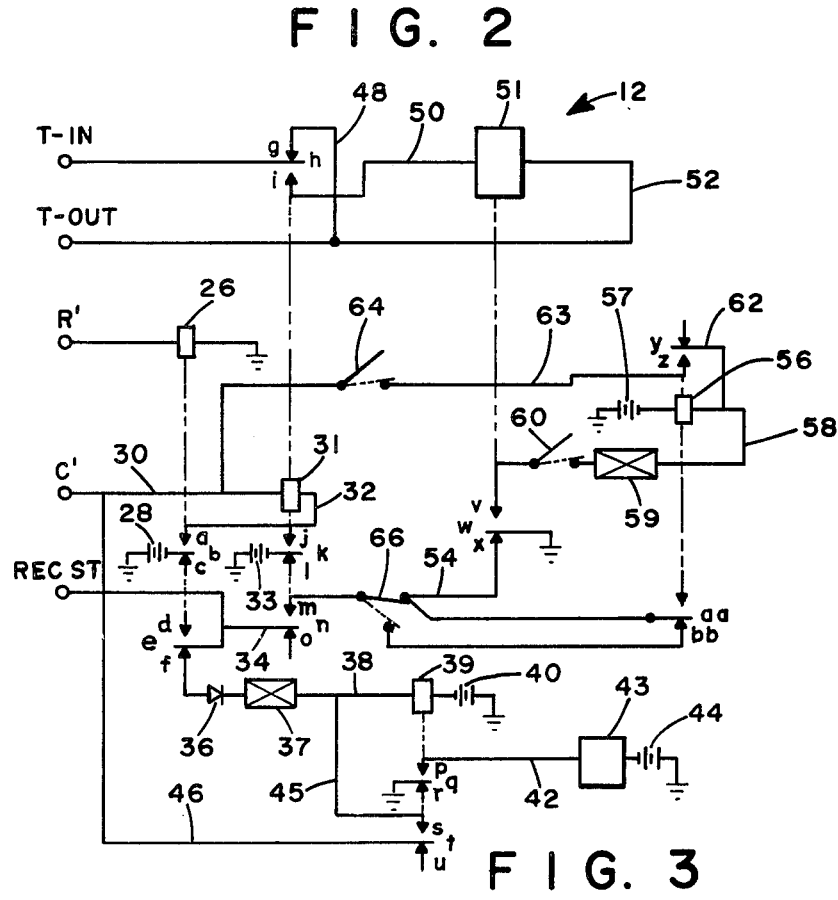
FIG. 3 is a circuit diagram of a toll fraud detector embodying this invention.

Circuit details of detector 12 are shown in FIG. 3. Terminal R′ is connected to ground through a ringing relay 26 which is operatively connected to springs a, b, c, d, e and f as indicated by the vertical broken line. Spring b is connected to the negative terminal of a battery 28, the positive terminal of which is grounded. When ringing relay 26 is energized, spring b moves from the open position against spring c to closed position against spring a and simultaneously spring e moves from the closed position against spring f to the open position against spring d.

Terminal C′ is connected by a line 30 to relay 31 which is operatively connected to relay springs g-o, inclusive. Relay 31 is connected by line 32 to spring a of relay 26 as well as to its own spring j. spring k is connected by battery 33 to ground and together with spring j constitutes a hold-in circuit for relay 31. As shown, spring n is in the normally open position and is connected by line 34 to the Rec. St. terminal and to spring e.

Spring f is connected by diode 36 to time delay switch 37 which is connected by line 38 through relay 39 and through battery 40 to ground. Switch 37 comprises normally open contacts coupled with an adjustable timing device or timer which, when energized by battery 40 upon grounding of line 34, causes the switch contacts to close after the predetermined interval of the timer. Relay 39 is energized when switch 37 contacts close. Switch 37 is a commercially available component, an example of which is an Artisan timer manufactured by Artisan Electronics Corporation.

Relay 39 is operatively connected to relay springs p, q, r, s, t and u. Spring p is connected by line 42 to a register 43, commonly known as a peg count meter, which in turn is connected through battery 44 to ground. Spring s is connected by line 45 to line 38 and spring t is connected by line 46 to terminal C′. When relay 39 is energized by the closing of time delay switch 37, register 43 is activated by the grounding of spring p through spring q so as to set or cock the register; upon subsequent deenergization of relay 39 and the opening of spring p, register 43 is deenergized and at that time marks the occurrence of a fraudulent call. Register 43 is of a well known design and is available in the commercial market. The closure of springs s and t provides a hold-in circuit for relay 39 which maintains the latter in the energized state as long as terminal C′ is grounded, i.e., while the calling party telephone is in the off-hook state.

Terminal T-in is connected to spring h of relay 31; when the latter is deenergized, the T-in terminal is connected through springs h and g via line 48 to the T-out terminal. Connected to spring i by line 50 is a current sensitive relay 51, the opposite side of which is connected by line 52 to the T-out terminal. By way of example, relay 51 may be Type 50 RO1 manufactured by Sigma Corporation. Relay 51 is operatively connected to relay springs v, w and x, the latter spring being connected by line 54 to spring m of relay 31. Spring w is connected to ground and normally engages spring x when relay 51 is not energized, i.e., when no current is flowing in the T lead, so as to energize the timer of switch 37 and the Rec. St. terminal.

Figure 4:
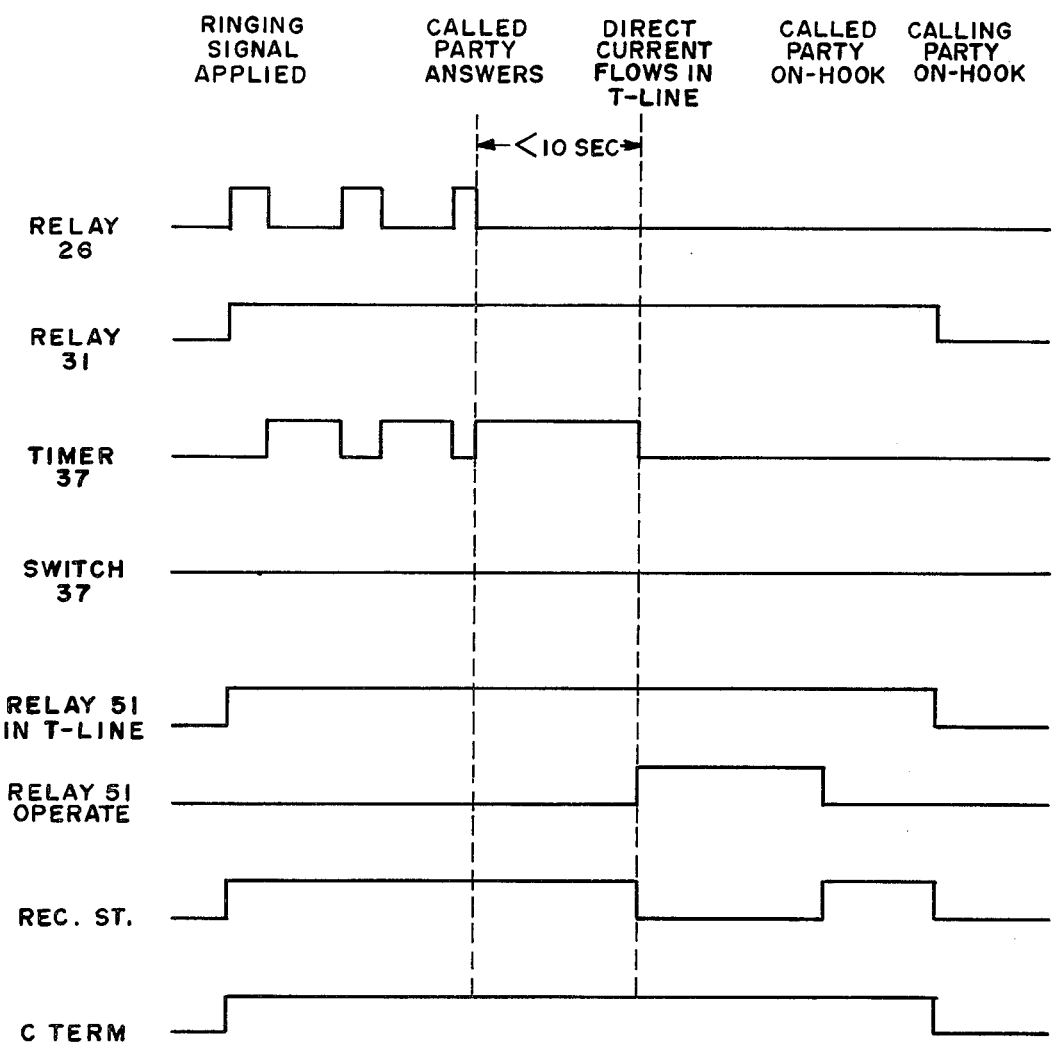
FIGS. 4 and 5 are sequence diagrams illustrating the operation of the toll fraud detector under good call and fraudulent call conditions, respectively.

The operation of the circuit will now be described in conjunction with the sequence diagrams shown in FIGS. 4 and 5. Referring now to FIG. 4, a ringing signal is applied by the ringing signal generator to lead R and energizes relay 26 via terminal R′ each time the ringing current is present. Since this condition is cyclic, relay 26 is turned on and off cyclically as indicated. On the first operation of relay 26, relay 31 is energized initially by battery 28 through springs b and a and thereafter by battery 33 through springs k and j of the hold-in circuit. As noted above, terminal C′ is connected to ground through the switching circuits of the telephone central office as long as the calling party telephone is in the off-hook state. Operation of relay 31 also connects current sensitive relay 51 in series in the T lead through springs h and i and also connects the recorder start terminal to ground through springs n and m of relay 31 and through springs x and w of relay 51. Such grounding of the recorder start terminal turns recorder 21 on and enables it to record audio signals on the subscriber's R and T leads via connection lines 23 and 24, see FIG. 2.

Simultaneously with actuation of recorder 21, the timer of switch 37 is energized by battery 40 through springs f and e of relay 26 when the latter is not energized by the ringing signal. Each time relay 26 is energized, the timer of switch 37 is reset to zero.

Assume the called party answers during the third ring as indicated in the diagram. When his telephone goes off-hook, relay 26 is deenergized and the timer of switch 37 is energized so as to begin the 10-second delay interval. Switch 37 remains open during this interval. When the called party answers, direct current flows in the T lead and energizes relay 51 which disengages springs w and x to remove the ground connection from the timer of switch 37 as well as from the recorder start terminal. It should be noted that the actuation of relay 51 and the removal of the called party handset from its cradle occur substantially simultaneously. Since switch 37 has not closed, relay 39 and register 43 remain deenergized so that no fraudulent call is indicated.

Upon return of the called party telephone to the on-hook state, relay 51 is deenergized because direct current has ceased to flow in the T lead. This action of relay 51 returns a ground connection to the recorder start terminal which condition persists until the calling party also goes on-hook. When this occurs, relay 31 is deenergized, relay 51 is removed from the T lead and the ground connection to the Rec. St. and C′ terminals is removed. The detector is then prepared to respond to the next call.

Figure 5:
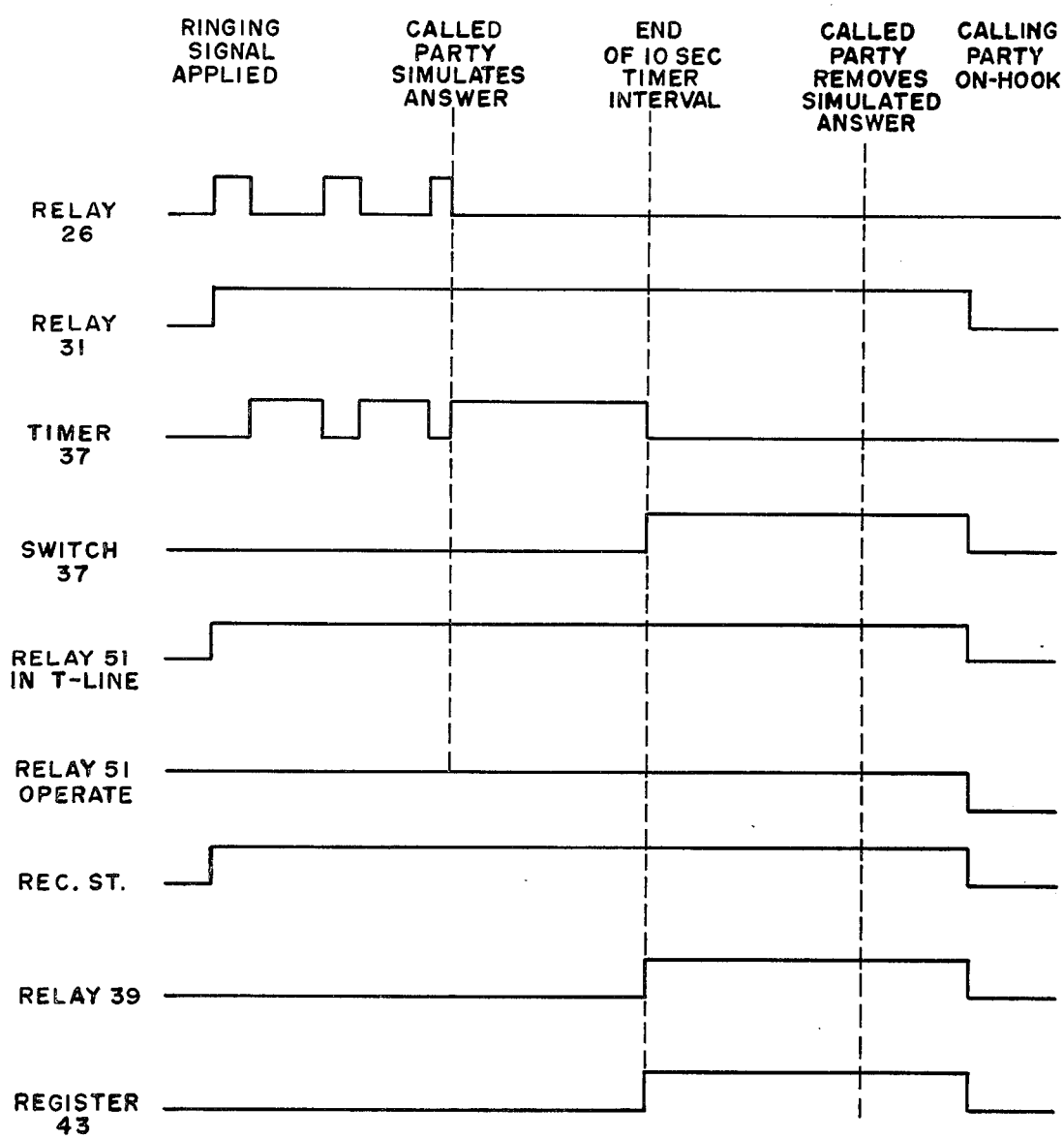

Referring now to FIG. 5, a fraudulent "Black Box" call is assumed. Up to the point in the sequence of events where the called party simulates an answer, the detector operates as described above in connection with FIG. 4. The answer simulated by the "Black Box" interrupts the ring generator but does not generate direct current in the T lead in order to prevent actuation of the toll charge billing equipment in central office O₁. In the absence of this direct current, relay 51 remains deenergized and the timer portion of delay switch 37 runs for its full 10-second interval. At the end of this interval, switch 37 closes and connects line 38 to ground through relay springs f, e, n, m, x and w. This causes relay 39 to be energized by battery 40, moving relay spring q against spring p and causing activation of register 43 by battery 44. Springs s and t of relay 39 also close and connect relay 39 to grounded terminal C' to provide a hold-in circuit for relay 39 as long as a ground remains on the C line.

When the called party restores his line to its original state by disconnecting the "Black Box", there is no change in operating states of detector circuit components. When the calling party goes on-hook, however, ground is removed from terminal C', relay 31 is deenergized, switch 37 opens and Rec. St. terminal becomes ungrounded because of the opening of springs m and n, relay 39 and register 43 are deenergized and, at this time, a fraudulent call is permanently indicated by the latter. The circuit is now prepared to respond to the next call.

At the completion of a good call and after the called party goes on-hook, there is a remote possibility that the calling party may not go on-hook for a period greater than the delay interval of switch 37, i.e., 10 seconds. In this event, ground will have been applied to delay switch 37 for the 10-second interval so that switch 37 will close to energize relay 39 and register 43 and set the latter for indicating a fraudulent call at the time the calling party goes on-hook. Although occurrence of such a sequence is unlikely, it can subtract from the evidentiary value of information generated by the toll fraud detector, and, in accordance with this invention, provision is made to avoid this result by a modification of the circuit. This includes a relay 56 connected on one side to a battery 57 to ground and on the other side by line 58 to a 5-second time delay switch 59 connected through manual switch 60 to spring v of relay 51. Relay 56 operates normally open relay springs y and z and is connected by line 62 to spring y. Spring z is connected by line 63 through normally open manual switch 64 to line 30 of the terminal C'. Relay 56 also operates normally closed relay springs aa and bb which are connected in series with line 54 by manual switch 66. These additional circuit components are operatively connected to the previously described detector circuit without affecting the operation thereof by moving switches 60, 64 and 66 from the solid line to the broken line positions.

The operation of this additional circuitry is as follows. Assuming good call circumstances as described in connection with FIG. 4 and with switches 60, 64 and 66 in their broken line positions, energization of relay 51 due to direct current flowing in the T lead applies an electrical ground from spring w through spring v and manual switch 60 to the 5-second delay switch 59, the opposite side of which is energized by battery 57 through relay 56 and line 58. After the 5-second interval, switch 59 closes, energizing relay 56, opening springs aa and bb while closing springs y and z, the latter springs acting as a hold-in circuit for relay 56 as long as terminal C' is grounded (while the calling party telephone is off-hook). The opening of springs aa and bb removes ground from spring m and thus from timer switch 37 as well as from the Rec. St. terminal and prevents energization of relay 39 and register 43 while the calling party telephone remains off-hook. When it is finally returned to the on-hook state, ground is removed from terminal C' causing deenergization of relay 56, opening of springs y and z and closing of springs aa and bb. This returns the detector circuit to its initial operating state in readiness for the next call whether good or fraudulent.

In the event the "Black Box" is used, relay 51 does not operate and switch 59 and relay 56 remain unconnected from the circuit which performs as described above to record the occurrence of a fraudulent call.

It will be understood that practice of the invention is not limited to use of electromechanical relays and switches but also comprehends use of solid state equivalents of such components. The foregoing description is illustrative of an embodiment of the invention and the appended claims define the scope of the invention.

What is claimed is:

1. In a telephone system having a toll fraud detector, said system comprising switch means adapted to selectively connect the telephone of a remotely located calling party to the telephone of a local called party and having tip (T), ring (R) and control (C) leads interconnecting said switch means and said called party telephone, said system having a ringing signal generator with an output connectable through said switch means to said R lead and having an electrical ground connectable through said switch means to said C lead in response to the off-hook state of the calling party telephone and having a source of direct current connected to said T lead whereby direct current flows in said T lead when the called party telephone is in the off-hook state, said detector comprising a first relay connected in parallel with said R lead and energizable by said output of said generator, a second relay, a third party connected to said C lead and being operative in response to energization of said first relay to connect said second relay in series with said T lead whereby said second relay is adapted to be energized solely by said direct current in said T lead, a normally open time delay switch, means to close said switch after a predetermined time interval in response to energization of said third relay, a fraudulent call indicator responsive to the closing of said switch to indicate a fraudulent call, and means responsive to energization of said relay to disable operation of said switch closing means.

2. The detector according to claim 1 in which said third relay has a hold-in circuit adapted to lock said third relay in the operative state independently of said first relay.

3. The detector according to claim 1 in which said switch closing means comprises a source of energy connected to one side of said switch and an electrical ground connectable to the other side thereof, and timing means adapted to be activated by said source and connected to said switch to close the latter after said interval, said timing means being automatically resettable when said switch is deenergized, and means responsive to energization of said first relay to deenergize said switch and reset said timing means.

4. The detector according to claim 3 with a fourth relay responsive to closing of said switch to activate said indicator, and means to maintain activation of said indicator while said C lead remains grounded.

5. The detector according to claim 4 in which said indicator has means for permanently registering a fraudulent call upon removal of ground from said C lead.

6. The detector according to claim 5 with means for preventing the registering of a fraudulent call when the calling party's telephone remains in the off-hook state longer than said predetermined interval after the called party's telephone is returned to the on-hook state comprising
- a fifth relay adapted to be energized in response to operation of said second relay, said fifth relay having a hold-in circuit connected to said C lead whereby said fifth relay remains energized independently of said second relay while said C lead is grounded, and
- means responsive to energization of said fifth relay to reset said timing means whereby to prevent activation of said indicator.

7. In a telephone system having a toll fraud detection circuit, said system comprising switch means adapted to selectively connect the telephone of a remotely located calling party to the telephone of a local called party and having tip (T), ring (R) and control (C) leads interconnecting said switch means and said called party telephone, said system having a ringing signal generator with an output connectable through said switch means to said R lead and having a ground connectable through said switch means to said C lead in response to the off-hook state of the calling party telephone and having a source of direct current connected to said T lead whereby direct current flows in said T lead when the called party telephone is in the off-hook state, said detection circuit comprising
- means for detecting the flow of said direct current in said T lead,
- a fraudulent call indicator,
- delay means responsive to said ringing signal generator output for activating said indicator after a predetermined time interval, and
- means responsive to said detecting means for disabling activation of said indicator when direct current flows in said T lead.

* * * * *